United States Patent [19]
Arenas et al.

[11] Patent Number: 5,895,888
[45] Date of Patent: Apr. 20, 1999

[54] SNAP-ON WALLPLATE SYSTEM

[75] Inventors: Alfredo Arenas, Hauppauge; Anthony Tufano, North Massapequa, both of N.Y.

[73] Assignee: Leviton Manufacturing Co., Inc., Little Neck, N.Y.

[*] Notice: This patent is subject to a terminal disclaimer.

[21] Appl. No.: 08/978,923

[22] Filed: Nov. 26, 1997

Related U.S. Application Data

[63] Continuation of application No. 08/757,275, Dec. 2, 1996, Pat. No. 5,723,817, which is a continuation of application No. 08/182,910, Jan. 4, 1994, abandoned.

[51] Int. Cl.$^6$ .................................................. H02G 3/14
[52] U.S. Cl. .............................................. 174/66; 220/241
[58] Field of Search .......................... 174/66, 67, 57, 174/49; 220/241, 242, 3.8, 3.92, 3.94, 4.02; D8/353; D13/152

[56] References Cited

U.S. PATENT DOCUMENTS

| | | | |
|---|---|---|---|
| 4,631,354 | 12/1986 | Boteler | 174/66 |
| 4,835,343 | 5/1989 | Graef et al. | 174/66 |
| 5,180,886 | 1/1993 | Dierenbach et al. | 174/66 |
| 5,456,373 | 10/1995 | Ford | 220/242 |
| 5,723,817 | 3/1998 | Arenas et al. | 174/66 |

FOREIGN PATENT DOCUMENTS

| 1238412 | 9/1989 | Japan | 174/66 X |
|---|---|---|---|

*Primary Examiner*—Dean A. Reichard
*Attorney, Agent, or Firm*—Paul J. Sutton

[57] ABSTRACT

A cover plate device for covering a wall mounted wiring device having no visible fasteners when installed. An attachment plate is attached over and to a wiring device which has been mounted in and to a ganged box mounted adjacent an aperture in a wall. Latch pawls are arranged at the opposite longitudinal ends of the attachment plate. A cover plate member overlies the wiring device and ganged box and provides a series of recesses to receive the associated pawls in locking arrangement. Because of the number of recesses available at each pawl location, the cover plate can still be installed even if the wall is not flat or even. The attachment plate and cover plate member can be provided with various types and numbers of apertures, and the number of pawls and groups of recesses employed depend on the size of the attachment and cover plate members.

18 Claims, 7 Drawing Sheets

SNAP-ON WALLPLATE SYSTEM

This a continuation of application Ser. No. 08/757,275 filed on Dec. 2, 1996, now U.S. Pat. No. 5,723,817, which is a continuation of application Ser. No. 08/182,910 filed on Jan. 4, 1994 and now abandoned.

BACKGROUND OF THE INVENTION

1. Field of the Invention

The invention is directed to the field of installing wiring devices to ganged boxes mounted in building walls and more particularly to the provision of cover plate devices which can be used to cover such wiring devices to prevent unwanted access to such wiring devices and at the same time provide a finished look without exposed fasteners.

2. Description of the Prior Art:

At present when it is desired to install a wiring device such as a switch, a receptacle, a duplex receptacle, a combination receptacle and switch, etch, in a wall of a building, whether public, commercial or residential, it is necessary to cut a hole into such wall and install a ganged box adjacent the hole by attaching such box to a stud or the like. The ganged box is hollow to receive such wiring devices and provides pairs of mounting ears for mounting the wiring devices within and to the box. The size of the box is selected to accept all the wiring devices required at that location and the number of pairs of mounting ears will be equal to the number of possible wiring devices which the box can receive. Once the wiring device is connected to the various conductors it will service, the wiring device is screwed to at least one pair of ears to mount the wiring device in and to the box. When all wiring devices are in place a cover plate having suitable apertures through it will be installed over the exposed wiring devices and the ganged box. The method of fastening the cover plate to the wiring devices is to use screws which pass through the cover plate and are received in threaded apertures in such wiring devices. The usual arrangement of mounting screws is one between each duplex receptacle and two, one to each side, for a switch. Thus, when a prior art wiring system containing two duplex receptacles and a switch was completes one could see four exposed mounting screws. This made the completed job unsightly and could expose the user to a shock hazard if the correct insulation were not used during assembly.

One prior art approach to hide these unsightly and potentially hazardous fasteners is shown in U.S. Pat. No. 4,873,396 issued Oct. 10, 1988 to Guity-Mehr. The cover plate was fashioned with an M-shaped groove near the bottom of the plate's back surface which could be positioned under the head of the lower fastening screw used to anchor the wiring device to the ganged box mounting ear. This mounting screw would have to be mounted so that the proper length of its body remained outside of the wiring device to be gripped by the M-shaped groove. If the screw was not sufficiently installed the cover plate would be free to rattle and if the screw was installed too deeply the M-shape groove could not be positioned under the screw head.

Once the cover plate was positioned with the M-groove under the mounting screw, the cover plate is positioned so that the second mounting screw can be installed in a recessed groove in the front of the cover plate and screwed into the wiring device. Then a screw groove cover is fitted over the screw groove to hide the screw head and the screw groove.

SUMMARY OF THE INVENTION

The present invention overcomes difficulties noted above with respect to the devices of the prior art.

The present invention provides a cover plate device that is quickly and easily installed using simple tools and available fasteners and which can be quickly and easily removed and can be fit upon walls that are not flat and even.

This is accomplished by a two part device, the first an attachment member which is installed over a wiring device and mounted to such wiring device. The attachment member is symmetrical about its longitudinal and transverse axis so that there is no concern for its orientation. At its opposed, transverse ends, latching pawls are placed to each side of a central tab used to separate the cover plate member from the attachment member.

The second part is a cover plate member which has no fastener holes extending through it and only has apertures to receive the wiring device projections as needed. A ridge extends about the periphery of the rear face of the cover plate member, and along the inside of its top transverse end it contains two saw-tooth shaped racks to receive in locking engagement the associated latching pawls of the attachment member. In the bottom transverse end, the two saw-tooth shaped racks flank a slot through which a small tool of appropriate shape can be inserted to contact the tab of the attachment member and employ it as a fulcrum to pry off the cover plate member latched to the attachment member. The use of multi-step racks allows each pawl to mate with its associated rack independently and thus accommodate variations in the flatness or evenness of the wall. This flatness or evenness is a greater problem as the cover plate member is increased in size to cover many wiring devices installed in ganged boxes. It is an object of this invention to provide an improved cover plate device for wall mounted electrical wiring devices.

It is another object of this invention to provide an improved cover plate device for wall mounted electrical wiring devices having no visible fasteners when installed.

It is yet another object of this invention to provide an improved cover plate device for wall mounted electrical wiring devices which is quickly and easily installed or removed.

It is still another object of this invention to provide a two part device, one of which is installed using available fasteners and the second is installed to the first without visible fasteners.

It is a further object of the invention to provide a cover plate device which can be properly positioned over wiring devices installed in a wall which is not flat or even.

Other objects and features of the invention will be pointed out in the following description and claims and illustrated in the accompanying drawings which disclose, by way of example, the principles of the invention and the best modes which are presently contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
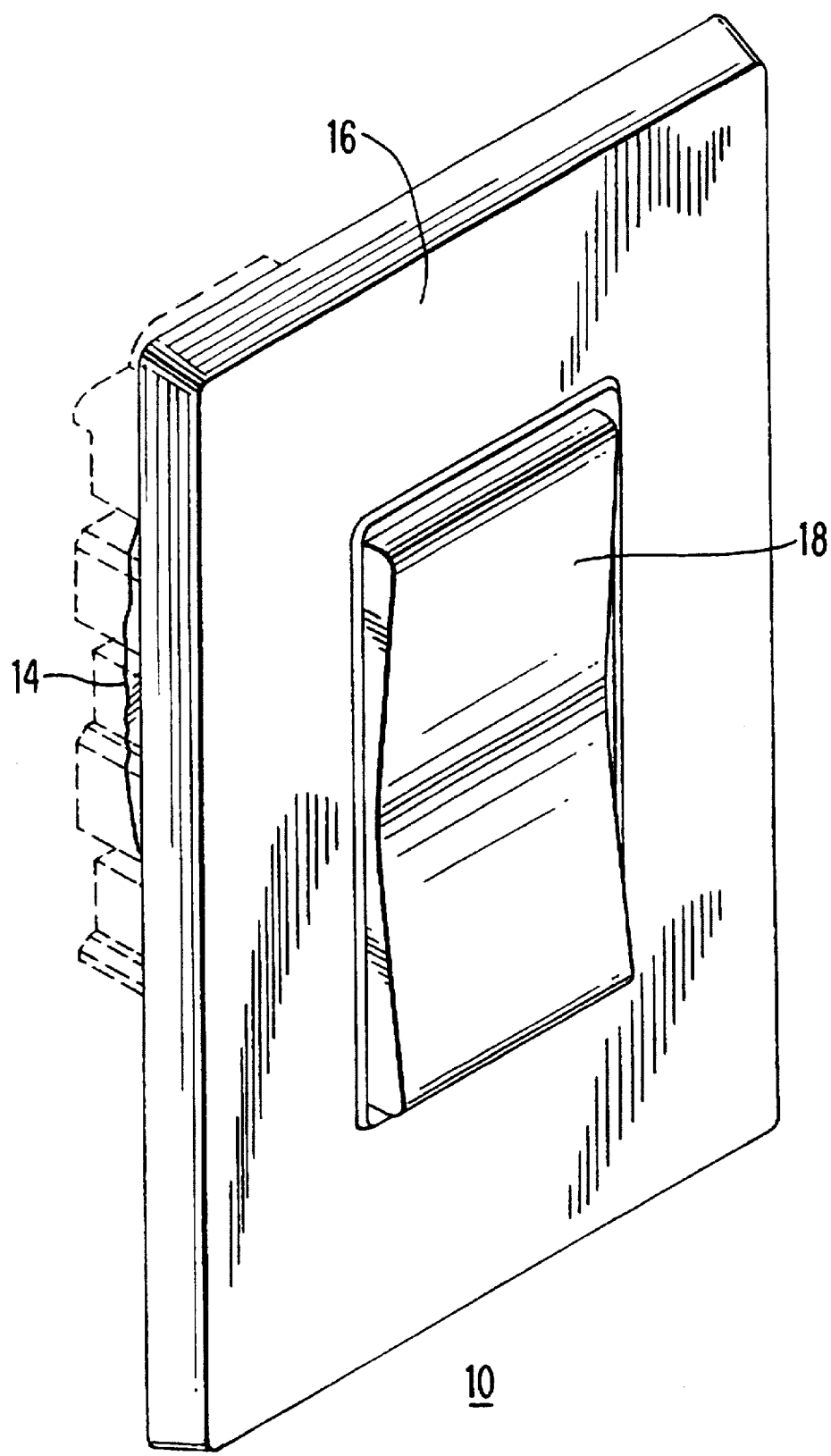
FIG. 1 is a front prospective view of the cover plate device installed over a wall mounted rocker switch in accordance with the instant invention.

Turning now to FIGS. 1 to 5, there is shown a cover plate device 10 constructed in accordance with the concepts of the invention. A suitable aperture 14 is cut into wall 12 to gain access to a ganged box mounted to a stud 15 or to permit installation of a suitable box to an adjacent stud or directly to the material of the wall (such as plasterboard). The ganged box 13 will be large enough to accept as many wiring devices as are needed. The ganged box 13 is made of metal or plastic and has one or more openings to permit the introduction of cable into the interior of the box 13. it has mounting means 19 to permit it to be anchored to an adjacent stud and pairs of mounting ears 21, each of which contains a threaded aperture 23 to which can be fastened the mounting screws of the wiring device such as, for example, rocker switch 18. In the normal order of things the wiring device is fastened to the box mounting ears 21 and the cover plate is then attached by screws to the wiring device, leaving at least one exposed mounting screw. The mounting screws have a small square of insulation about them to insulate the wiring device from the mounting ears 21 of ganged box 13. Absent such insulation the wiring device and the cover plate could become electrically hot if the ganged box comes into contact with a bare, hot conductor.

The device of FIG. 1 clearly shows that when completely installed cover plate device 10 has no exposed mounting screws or other visible metal hardware. The only visible parts are the cover plate 16 and the rocker switch 18.

Figure 2:
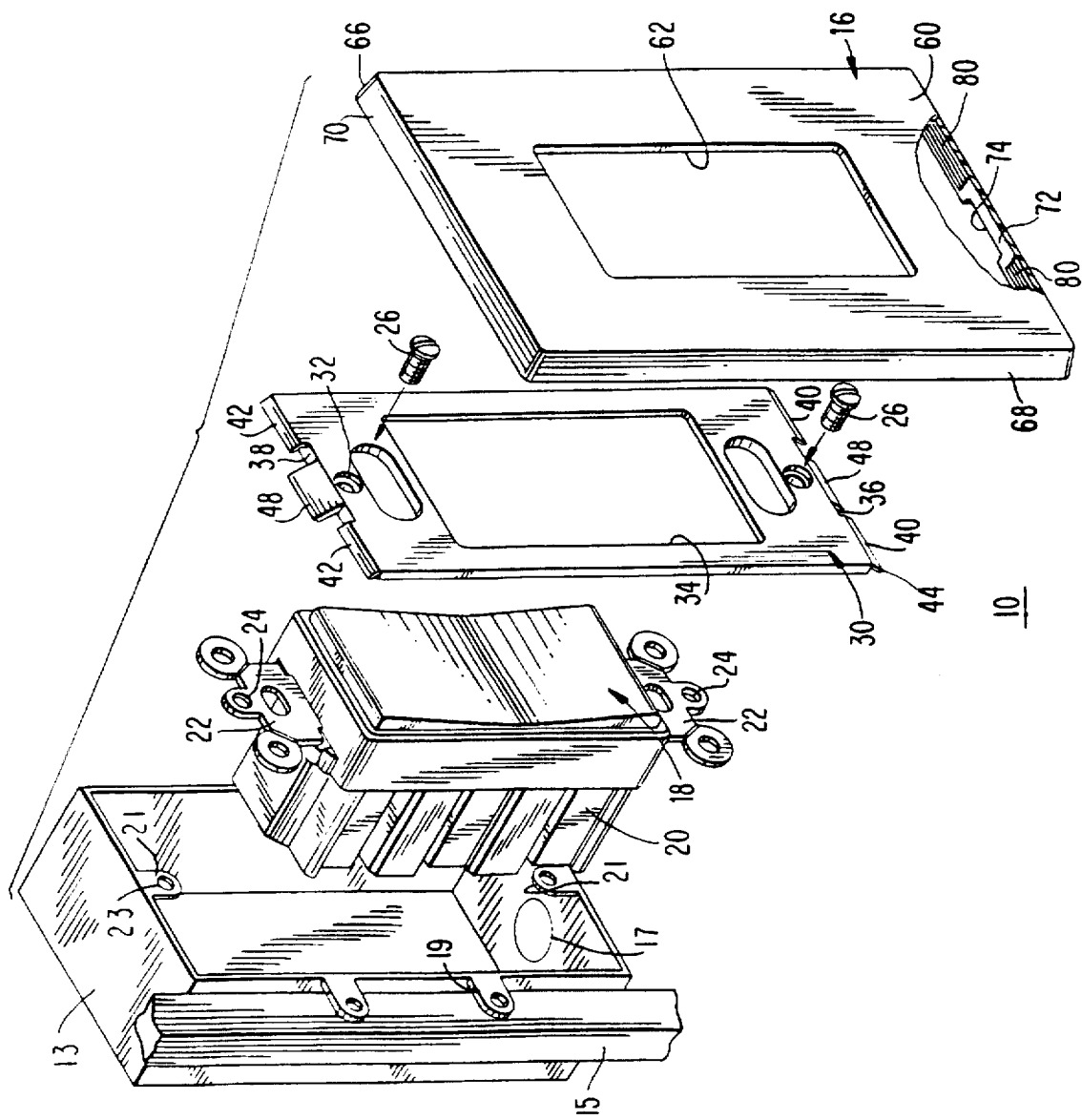
FIG. 2 is an exploded view of the device of FIG. 1.
Figure 3:
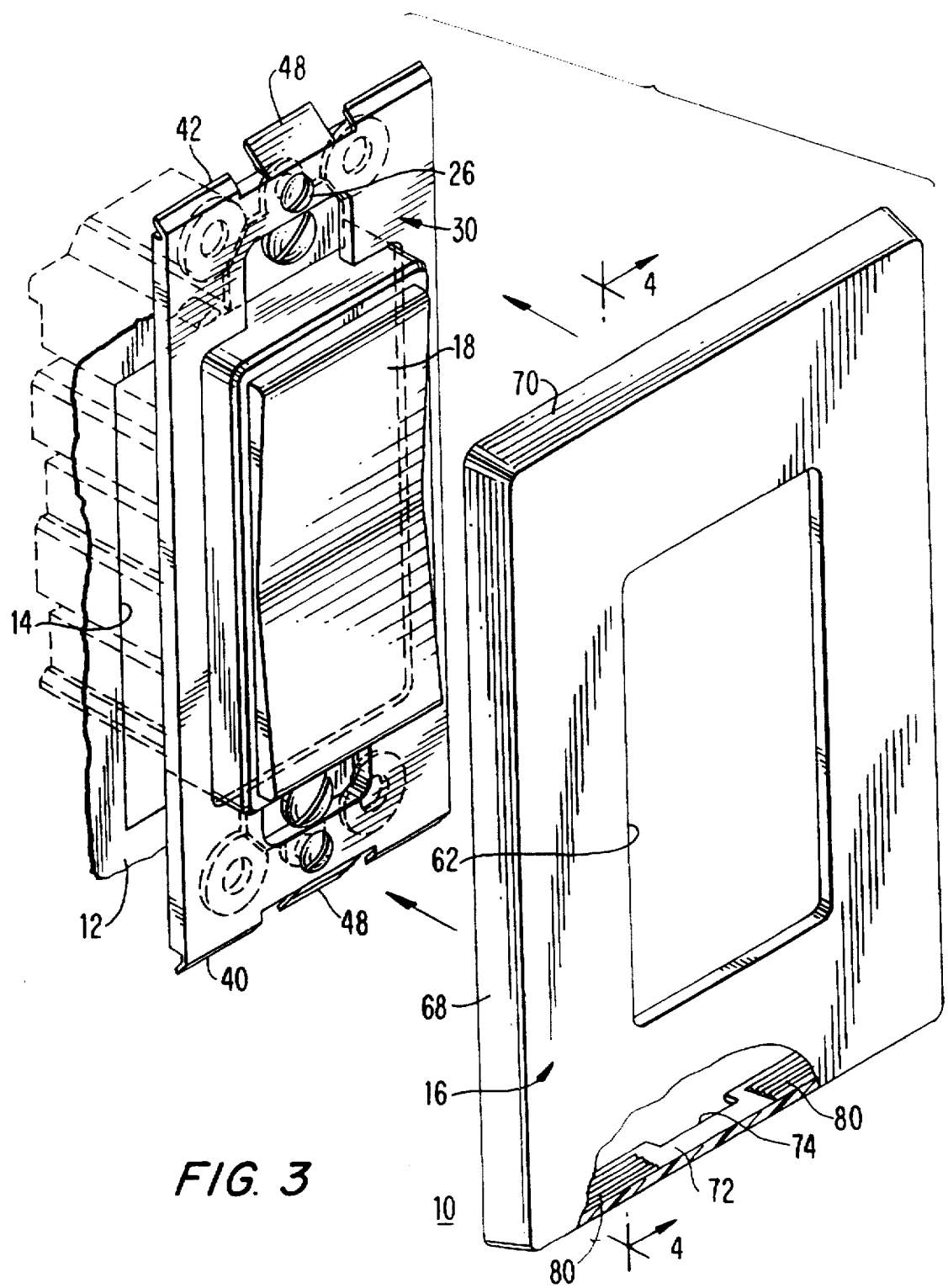
FIG. 3 is a front prospective, exploded view of the device of FIG. 1, showing the assembly of a first portion of the cover plate device over a wall mounted wiring device with the cover plate member separated to permit viewing of the assembly of the first portion with the wiring device.
Figure 4:
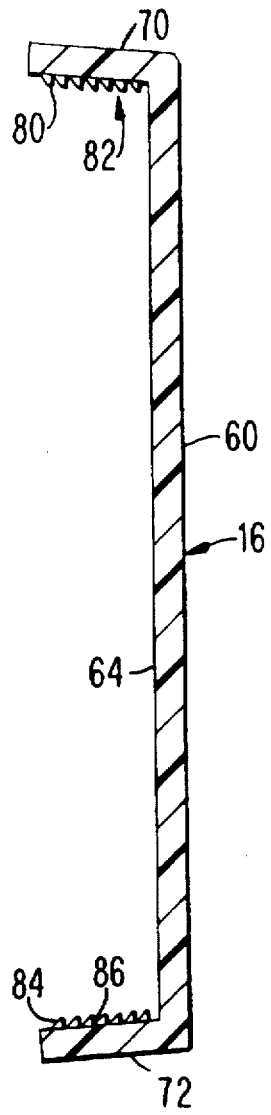
FIG. 4 is a side elevational view in, section, of the cover plate member of FIG. 3 taken along the lines 4—4.

As shown in FIG. 2, the rocker switch 18 has a body 20 which extends into the ganged box 13 and two lugs 22, one at each end of body 20, with threaded mounting holes 24 in each of such lugs 22. A mounting screw similar to screw 26 is passed through the unnumbered elongate mounting slots to mount switch 18 to the mounting ears 21 of the ganged box 13 as best seen in FIG. 3. With the instant invention an attachment plate 30 is attached to the switch 18 or other wiring device by the use of mounting screws 26. These pass through apertures 32 in the attachment plate 30 and engage the threaded apertures 24 in the lugs 22 of switch 18. Attachment plate 30 to engage an associated one of said threaded mounting holes 24. Attachment plate 30 also contains a main aperture 34 of a shape complementary with the profile of the wiring device which extends through it. (See FIG. 3) The aperture 34 in FIG. 2 is rectangular to accept rocker switch 18.

Figure 5:
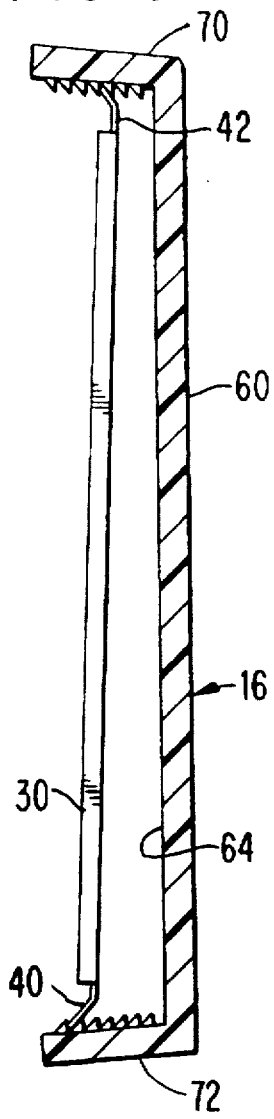
FIG. 5 is a side elevation, partially in section of the cover plate member as shown in FIG. 4 installed upon the attachment member of the invention.
Figure 5A:
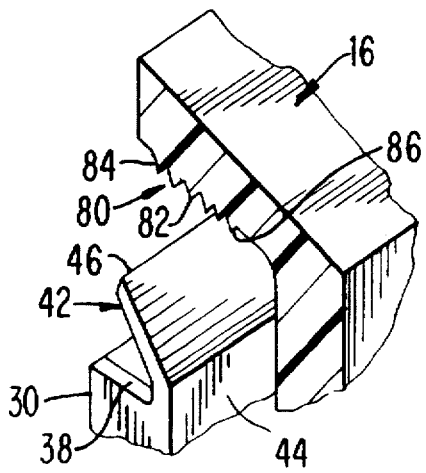
FIG. 5a is a fragmentary, enlarged side elevation of the latching pawl of the attachment plate engaging the saw-tooth rack of the cover plate, both of which are shown in FIG. 5.

At each end 36 and 38, respectively, of attachment plate 30 are placed two latching pawls 40 and two latching pawls 42, respectively. As best seen in FIG. 5a, the pawl 42 has a vertical leg 44 which is an extension of attachment plate 30 but is much thinner and terminates in an angled leg 46 which extends at about a 45° angle with respect to the horizontal top edge of end 38 of attachment plate 30.

Between each of the two latching pawls 40 and 42 is a tab 48 which will act as a tool pivot point for prying off the cover plate 16 when assembled to the attachment plate 30. As will be described below, a slot in the cover plate 16 lower edge provides access for the insertion of a small flat tool.

The cover plate 16 is proportioned to fit over the entire attachment plate 30 as well as the ganged box into which a single wiring devices such as rocker switch 18, is placed and to which it is fastened. Thus, the cover plate 16 is slightly longer than the wiring device along the longitudinal axis but is between 30 and 40 percent wider along the transverse axis. The width varies depending upon how many boxes are ganged.

The cover plate 16 has a front face 60 which is unbroken except for the central aperture 62 configured to the profile of the wiring device that extends through it and as shown in FIG. 2 is rectangular and a back face 64. Side walls 66 and 68 smoothly join the faces 60 and 64 to give a rounded upper edge to plate 16. The walls 66 and 68 flare out as they extend from plate 16 so that the bottom edge of walls 66 and 68 are further apart than where they join cover plate 16. End walls 70 and 72 also smoothly join faces 60 and 64 and further side walls 66 and 68 so that there are no sharp edges between the walls or between the walls and faces 60 and 64.

Figure 5B:
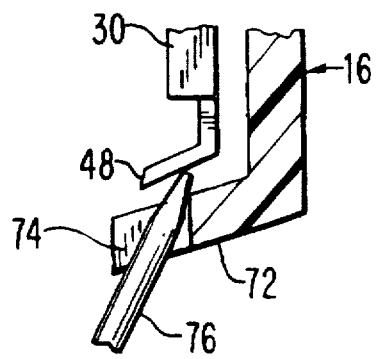
FIG. 5b is a fragmentary, enlarged side elevation in section of the cover and tab of the attachment plate to indicate how the two components can be separated following latching.

Placed in the bottom end wall or ridge 72 is a slot 74 which provides access to the tab 48 as is best seen in FIG. 5b. A small, flat tool blade such as screw driver blade 76, is moved through slot 74 in end wall 72 to contact both the outer surface of tab 48 and the back wall of slot 74. By moving the blade 76 in a counterclockwise direction using the back wall of slot 74 as a fulcrum the force applied to tab 48 will separate cover plate 16 from attachment plate 30.

To attach cover plate 16 to attachment plate 30 the pawls 40, 42 on attachment plate 30 are made to engage the saw-tooth shaped racks 80 on the inner surfaces of end walls or ridges 70 and 72 of cover plate 16. There are two racks 80 on end wall 70 and two racks 80 on end or ridge 72. Each rack 80 contains a number of saw-tooth shaped teeth 82 each having an inclined front face 84 and a vertical back face 86. As best seen in FIG. 5a, as angled leg 46 engages the inclined front face 84 the pawl 42 is made to deflect in a counterclockwise direction sufficiently so that pawl 42 can get by the tip of the first tooth 82. Once leg 46 is past the tip of tooth 82, it can return to its initial position and take a position between the vertical back face 86 of first tooth 82 and the inclined front face 84 of a second tooth 82. This operation can be repeated as many times as needed to get the bottom edges of the cover plate 16 as close to the mounting wall as possible. Since each of the racks 80 and pawls 40, 42 are independently operated it is possible to get the cover plate 16 to closely follow the mounting wall contour even if the wall is not flat, even, plane etc. This ability to follow the wall contour is even more appreciated where the cover plate 16 is large, such as with a cover plate to cover four ganged boxes.

Once the angled leg 46 of the pawl 42 returns to its original position, any attempt to dislodge the cover plate 16 from the attachment plate 30 is opposed by the engagement of the vertical free edge of angled leg 46 with the vertical back face 86 of the tooth 82. However, since tool 76 can apply a great deal of force to tab 48 it is possible to separate plates 16 and 30.

Figure 6:
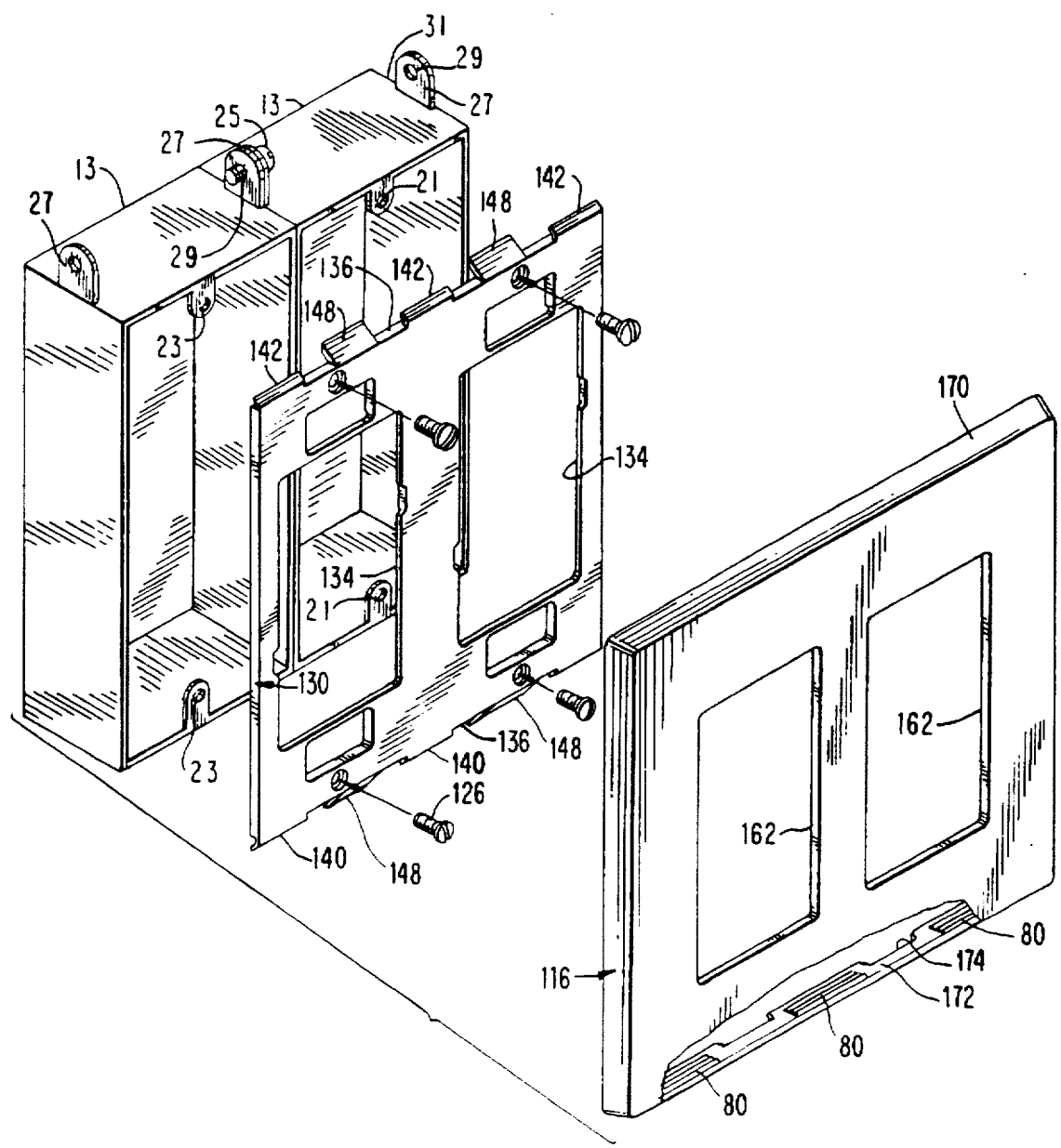
FIG. 6 is an exploded view of a cover plate device according to the invention to be used with two wiring devices.

FIG. 6 shows a cover plate device for two wiring devices. The two wiring devices can be placed in a double ganged box 31 made up of two single ganged boxes 13 and joined by fasteners 25 extending through the threaded apertures 29 of two joining ears 27. The double ganged box 31 provides four mounting ears 21 each with a threaded aperture 23 to receive the mounting screws of the wiring devices (not shown). Additional ganged boxes 13 can be added to increase the overall ganged box arrangement as required. Attachment plate 130 has two apertures 134 which are of the same configuration. However, any combination of wiring devices could be employed so that one of the apertures could be a cut-out for a duplex receptacle, and another for a toggle switch, etc. There will be three racks 80 on the interior of each of the end walls 172 and 170 (not shown) and three pawls 140, on end wall 136 and three pawls 142 on end wall 138 of attachment plate 130. Also there will be two tabs 148 which will be accessible via slots 174 in end wall 172 of cover plate 116. The attachment plate 130 is attached the same way as attachment plate 30 and the installation is completed by installing cover plate 116. Because of the independent operation of the pawls 140, 142 with their respective racks 80, the cover plate 116 will be able to compensate somewhat for irregularities in the wall in which the wiring devices are installed.

It appears that for any cover plate device which is to fit over an even number of ganged boxes or an even number of wiring devices there will be an odd number of racks 80 and an odd number of pawls 40, 42, 140, 142 and an even number of slots 74, 174 and an even number of tabs 48, 148.

Figure 8:
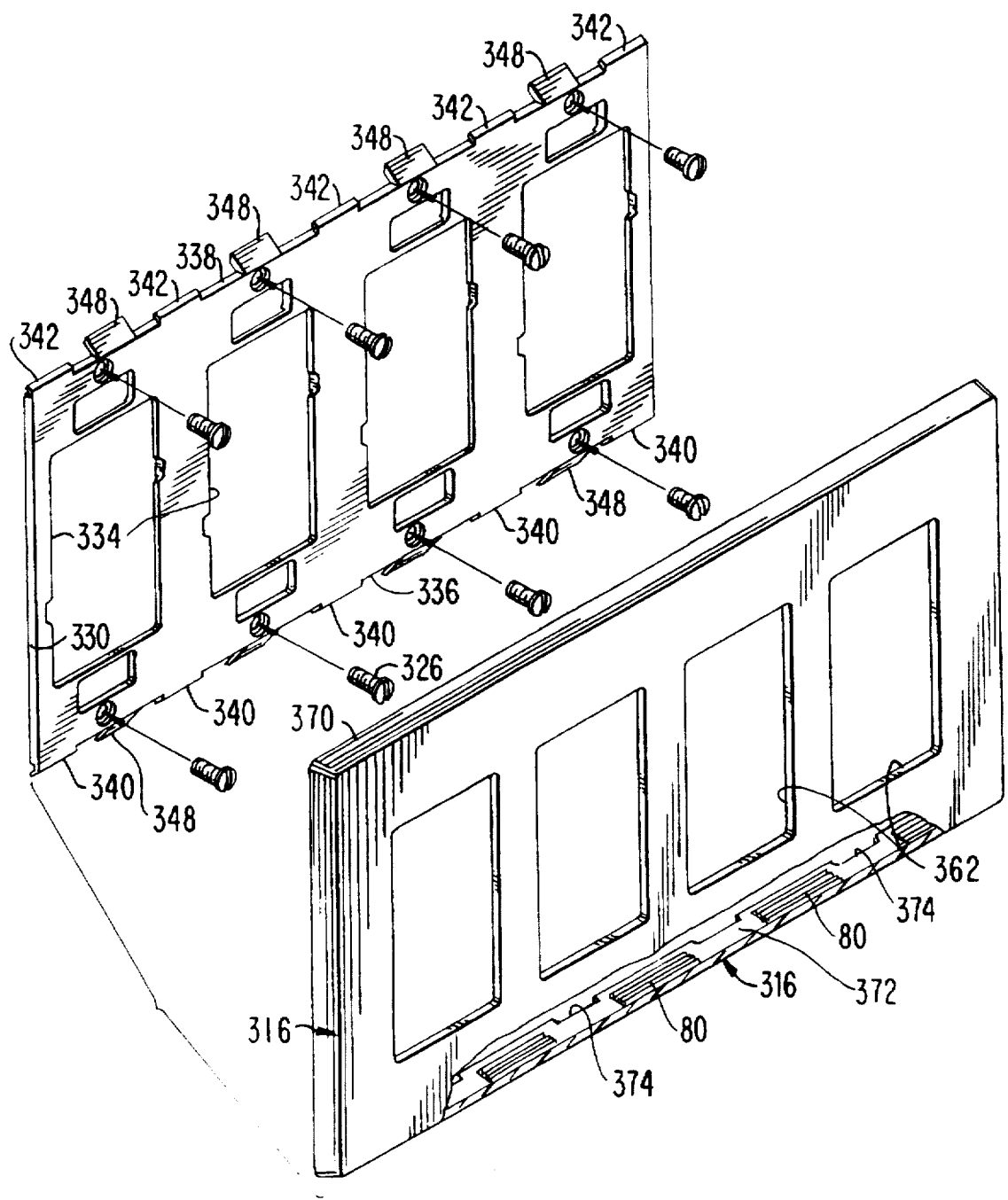
FIG. 8 is an exploded view of a cover plate device according to the invention to be used with four wiring devices.

FIG. 8 shows an arrangement to cover the installation of four ganged boxes and the four wiring devices they could mount. According to the observations made above, for an even number of wiring devices to be installed with the proper attachment plate 330 and cover plate 316, there will be four cut-outs or apertures 334 in attachment plate 330 and four cut-outs or apertures 362 in cover plate 316; five pawls 340 on end wall 336 and five pawls 342 on end wall 338 which each cooperate with an associated one of the ten racks 80 of cover plate 316, some of which are shown on the inside surface of the end walls such as 372. There will also be four tabs 340 which each can be reached through one of the slots 374 adjacent the associated tab 340.

Figure 7:
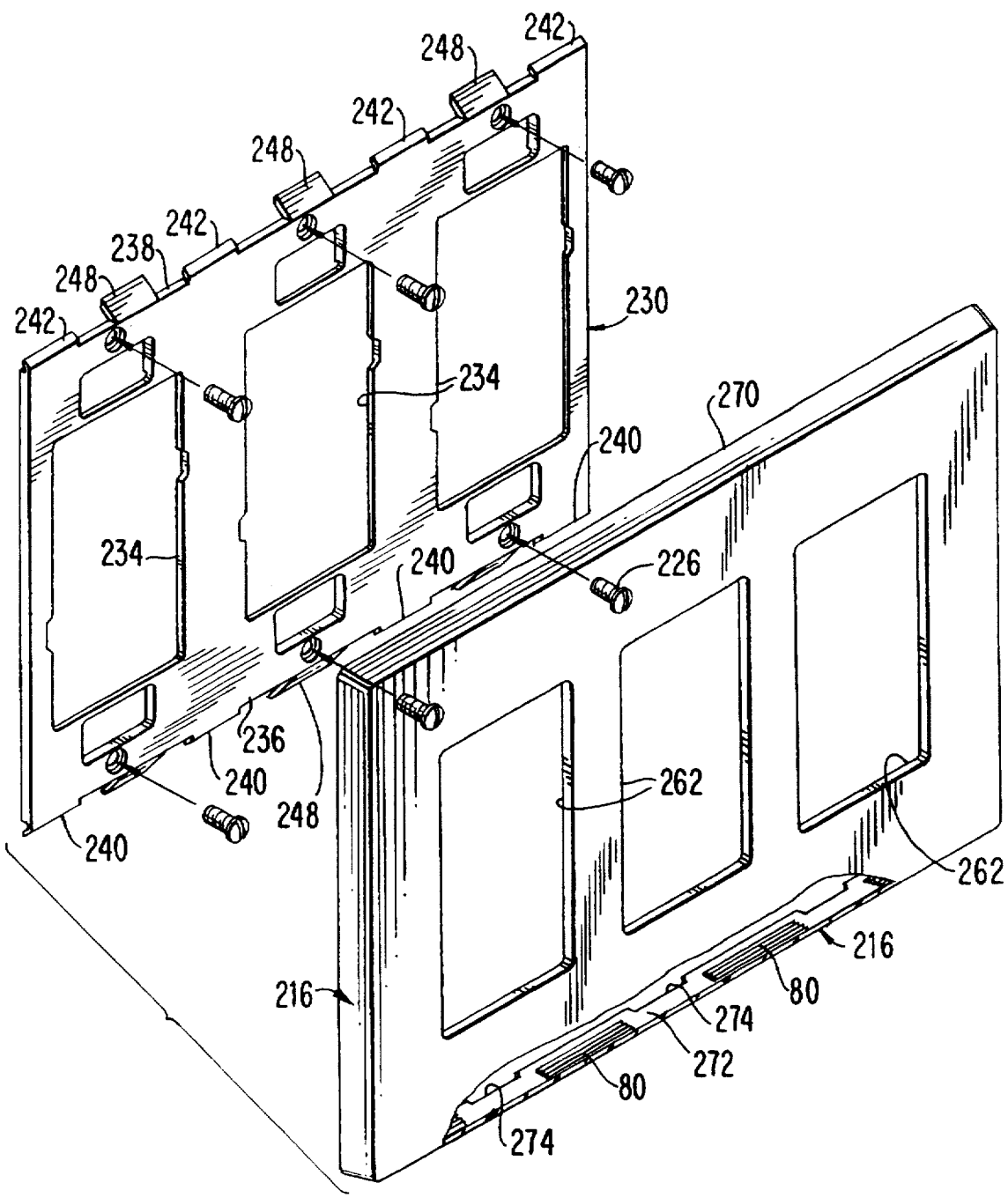
FIG. 7 is an exploded view of a cover plate device according to the invention to be used with three wiring devices.

In FIG. 7 there is shown an arrangement to cover three wiring devices mounted in three ganged boxes (not shown) with an attachment plate 230 and cover plate 216 each of which have three apertures 234 and 262, respectively. There are four pawls 240 on end wall 236 and four pawls 242 on end wall 238. The pawls 240 and 242 will engage an associated rack 80 some of which are shown on the inside surface of the end wall 272 and the opposite end wall 270 (not shown). The three tabs 248 which are placed adjacent the slots 274 in wall 272 can be reached through those slots.

The order of installation of the device of FIG. 7 is substantially the same as already set forth. Attachment plate 230 is attached to the ears of the ganged boxes (not shown) using screws 226 after which the cover plate 216 is aligned and placed over the attachment plate 230 and locked thereto by the engagement of the pawls 240 and 242 with associated racks 80.

It should be evident now that where there is an odd number of cut-outs or apertures in the attachment plate and cover plate there will be an even number of pawls 40, 42, 240, 242, an even number of tabs 48, 248 and racks 80, and an odd number of slots 74, 274.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

1. A cover plate device for covering a wall mounted wiring device mounted in and to a ganged box mounted adjacent an aperture in a wall, said ganged box having a width dimension and a height dimension, said cover device having no visible fasteners when installed comprising:

a. a unitary, generally planar attachment member of generally uniform width having a first end and a second end and a width dimension substantially less than the width dimension of said ganged box, said attachment member having at least two mounting holes, at least one of said mounting holes adjacent said first end and at least one of said mounting holes adjacent said second end; said mounting holes permitting said attachment member to be attached adjacent a front face of and over said wiring device mounted in and to said ganged box after said wiring device is mounted in and to said ganged box;

b. at least two latch members adjacent each of said first end and said second end of said attachment member, each of said at least four latch members having a free end with a knife-edge thereat;

c. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than said ganged box width dimension and a height dimension greater than said ganged box height dimension and having a first end and a second end and positioned to overlie said attachment member and the ganged box in and to which said wiring device is mounted;

d. at least two sets of multiple recesses in the inner surface of said ridge adjacent each of said first and second ends of said cover plate member, said multiple recesses each being formed by a plurality of saw-tooth shaped teeth, each of said teeth forming a single recess of one of said multiple recesses and having an inclined front surface and a rear surface perpendicular to the inner surface of said ridge to receive a knife edge of an associated one of said at least two latch members on each of said first and second ends of said attachment member, said at least four latch members' knife-edges each coming to rest on said rear surface of one of said saw-tooth shaped teeth, each of said at least four latch members operating independently and each engaging one recess in an associated one of said at least four sets of multiple recesses based upon a position of the wall adjacent said aperture, to thereby assemble said cover plate member to said attachment member covering said attachment member, said ganged box and said aperture in said wall;

e. two tabs, one adjacent said first end of said attachment member and the other adjacent said second end of said attachment member, said tabs permitting, when engaged by a suitable tool, removal of said cover plate member from said attachment member; and f) one slot in said second end of said cover plate member, at a location corresponding to an associated one of the tabs on said attachment member to permit a suitable tool to enter such slot and contact the associated one of the tabs for removal of said cover plate member from said attachment member.

2. A cover plate device as defined in claim 1, further comprising:
   a. an aperture in said attachment member to permit at least a portion of the wiring device over which said attachment member is attached to project through said attachment member.

3. A cover plate device as defined in claim 1, further comprising:
   a. an aperture in said attachment member to permit at least a portion of the wiring device over which said attachment member is attached to project through said attachment member; and
   b. an aperture in said cover-plate member, at least partially aligned with and partially communicating with said aperture in said attachment member to permit at least a portion of the wiring device over which said attachment member is attached to project through said attachment member and said cover plate member.

4. A cover plate device as defined in claim 1, wherein said at least four sets of multiple recesses independently receive an associated one of said at least four latch members permitting said cover plate member to engage said attachment member even if said wall into which said ganged box is placed is not plane.

5. A cover plate device as defined in claim 1, wherein said at least two latch members adjacent each of said first and second ends of said attachment member are two latch members adjacent each of said first and said second ends of said attachment member, and each of said sets of multiple recesses being opposite an associated latch member on said attachment member, to independently receive an associated latch member in one of said recesses of said rack permitting said cover plate member to engage said attachment member even if said wall into which said ganged box is placed is not plane.

6. A cover plate device for covering at least two wall mounted wiring devices each mounted in and to one of an equal number of ganged boxes, one for each of said wiring devices mounted adjacent an aperture in a wall, said ganged boxes each having a width dimension and a height dimension, said cover plate device having no visible fasteners when installed comprising:
   a. a unitary attachment member having a first end and a second end and a width dimension substantially less than a total width dimension of said equal number of ganged boxes with which said cover plate device is employed, said attachment member having at least four mounting holes, at least two of said mounting holes adjacent said first end and at least two of said mounting holes adjacent said second end; said mounting holes permitting said attachment member to be attached to said at least two wiring devices mounted in and to said equal number of ganged boxes;
   b. at least two latch members adjacent each of said first end and said second end of said attachment member, each of said at least four latch members having a free end with a knife-edge thereat;
   c. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than a total width dimension of said equal number of ganged boxes and a height dimension greater than said ganged box height dimension and having a first end and a second end and positioned to overlie said attachment member and said equal number of ganged boxes in and to which said wiring devices are mounted; and
   d. at least two recesses in said inner surface of said ridge adjacent each of said first and second ends of said cover plate member, said recesses each being formed by a plurality of saw-tooth shaped teeth having an inclined front surface and a rear surface perpendicular to the inner surface of said ridge to receive a knife edge of an associated one of said at least two latch members on each of said first and second ends of said attachment member, said at least four latch members' knife-edges each coming to rest on said rear surface of one of said saw-tooth shaped teeth, each of said at least four latch members operating independently and engaging one of said at least four recesses based upon the wall adjacent said aperture to thereby assemble said cover plate member to said attachment member covering said attachment member, said equal number of ganged boxes and said aperture in said wall.

7. A cover plate device as defined in claim 6, further comprising:
   a. at least two apertures in said attachment member to permit at least a portion of each wiring device to which said attachment member is attached to project through said attachment member.

8. A cover plate device as defined in claim 6, wherein said at least four recesses independently receive an associated one of said latch members permitting said cover plate member to engage said attachment member even if the wall into which said equal number of ganged boxes are placed is not plane.

9. A cover plate device as defined in claim 6, further comprising:
   a. at least two apertures in said attachment member to permit at least a portion of each of the wiring devices to which said attachment member is attached to project through said attachment member; and
   b. at least two apertures in said cover plate member, each at least partially aligned with and partially communicating with each of said apertures in said attachment member to permit at least a portion of each wiring device to which said attachment member is attached to project through said attachment member and said cover plate member.

10. A cover plate device as defined in claim 9, wherein said attachment member has an even number of apertures; said cover plate member has an even number of apertures equivalent to the number of apertures in said attachment member; said attachment member has an odd number of latch members adjacent each of said first and second ends of said attachment member, the odd number of latch members adjacent said second end being equivalent to the odd number of latch members adjacent said first end; and wherein said at least four recesses are an odd number of sets of recesses adjacent each of said first and second ends of said cover plate member in said inner surface of said ridge equivalent to the number of latch members on said attachment member and arranged along said first end and said second end of said cover plate member on a one to one basis with said latch members, said latch members each independently taking a position in one of said recesses of said sets of recesses permitting said cover plate member to be mounted on said attachment member even if the wall into which said ganged boxes are placed is not plane.

11. A cover plate device as defined in claim 9, wherein said attachment member has an odd number of apertures; said cover plate member has an odd number of apertures equivalent to the number of apertures in said attachment member; said attachment member has an even number of latch members adjacent each of said first and second ends of said attachment member, the even number of latch members adjacent said second end being equivalent to the even number of latch members adjacent said first end; and wherein said at least four recesses are an even number of sets of recesses adjacent each of said first and second ends of said cover plate member in said inner surface of said ridge equivalent to the number of latch members on said attachment member and arranged along said first end and said second end of said cover plate member on a one to one basis with said latch members, said latch members each independently taking a position in a recess of an associated one of said sets of recesses permitting said cover plate member to be mounted on said attachment member even if the wall into which said ganged boxes are placed is not plane.

12. A cover plate device as defined in claim 6, wherein said at least two wiring devices is two, mounted in two ganged boxes comprising:
   a. said attachment member, wherein said at least four mounting holes is four, having two mounting holes adjacent said first end and two mounting holes adjacent said second end; said mounting holes permitting said attachment member to be attached to two wiring devices mounted in and to said two ganged boxes;
   b. wherein said at least four latch members is six, three adjacent said first end of said attachment member and three adjacent said second end of said attachment member;
   c. said cover plate member having a width dimension greater than said two ganged boxes over which said cover plate member is positioned; and
   d. wherein said at least four recesses are six sets of recesses in said inner surface of said ridge, three of said sets of recesses adjacent said first end of said cover plate member and three of said sets of recesses adjacent said second end of said cover plate member, each set of recesses positioned in said ridge to independently receive an associated one of said latch members permitting said cover plate member to be mounted to said attachment member even if the wall into which said two ganged boxes are placed is not plane.

13. A cover plate device as defined in claim 12, further comprising:
   a. two apertures in said attachment member, one to permit at least a portion of each wiring device to which said attachment member is attached to project through said attachment member.

14. A cover plate device as defined in claim 12, further comprising:
   a. two apertures in said attachment member, one to permit at least a portion of each wiring device to which said attachment member is attached to project through said attachment member; and
   b. two apertures in said cover plate member, each at least partially aligned with and partially communicating with an associated one of said apertures in said attachment member to permit at least a portion of each wiring device to which said attachment member is attached to project through said cover plate member after passing through said associated one of said two apertures in said attachment member.

15. A cover plate device for covering a wall mounted wiring device mounted in and to a ganged box mounted adjacent an aperture in a wall, said ganged box having a width dimension and a height dimension, said cover plate device having no visible fasteners when installed comprising:
   a. a unitary attachment member having a first end and a second end and a width dimension substantially less than the width dimension of said ganged box width dimension, said attachment member having at least two mounting holes, at least one of said mounting holes adjacent said first end and at least one of said mounting holes adjacent said second end; said mounting holes permitting said attachment member to be attached to said wiring device mounted in and to said ganged box;
   b. at least two latch members adjacent each of said first end and said second end of said attachment member, each of said at least four latch members having a free end with a knife-edge thereat;
   c. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than said ganged box width dimension and a height dimension greater than said ganged box height dimension and having a first end and a second end and positioned to overlie said attachment member and the ganged box in and to which said wiring device is mounted;
   d. at least two recesses in the inner surface of said ridge adjacent each of said first and second ends of said cover plate member, said recesses each being formed by a plurality of saw-tooth shaped teeth having an inclined front surface and a rear surface perpendicular to the inner surface of said ridge to receive a knife edge of an associated one of said at least two latch members on each of said first and second ends of said attachment member, said at least four latch members' knife-edges, each coming to rest on said rear surface of one of said saw-tooth shaped teeth, each of said four latch members operating independently and engaging one of said at least four recesses based upon a position of the wall adjacent said aperture, to thereby assemble said cover plate member to said attachment member covering said attachment member, said ganged box and said aperture in said wall;

said cover plate device further comprising:
   e. a tab adjacent each of said first and second ends of said attachment member; said tab permitting, when engaged by a suitable tool, removal of said cover plate member from said attachment member; and
   f. a slot in said second end of said cover plate member to permit a suitable tool to enter such slot and contact said tab for removal of said cover plate member from said attachment member.

16. A cover plate device for covering two wall mounted wiring devices each mounted in and to one of two ganged boxes, one for each of said wiring devices mounted adjacent an aperture in a wall, said ganged boxes each having a width dimension and a height dimension, said cover plate device having no visible fasteners when installed comprising:

a. a unitary attachment member having a first end and a second end and a width dimension substantially less than a total width dimension of said two ganged boxes with which said cover plate device is employed, said attachment member having four mounting holes, two of said mounting holes adjacent said first end and two of said mounting holes adjacent said second end; said mounting holes permitting said attachment member to be attached to said two wiring devices mounted in and to said two ganged boxes;

b. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than a combined width dimension of said two ganged boxes and a height dimension greater than said ganged box height dimension and having a first end and a second end and positioned to overlie said attachment member and said two ganged boxes in and to which said wiring devices are mounted;

c. six latch members, three adjacent said first end of said attachment member and three adjacent said second end of said attachment member, each of said six latch members having a free end with a knife-edge thereat;

d. six sets of recesses in said inner surface of said ridge, three sets of recesses adjacent said first end of said cover plate member and three sets of recesses adjacent said second end of said cover plate member, said sets each being formed by a plurality of saw-tooth shaped teeth having an inclined front surface and a rear surface perpendicular to the inner surface of said ridge to receive a knife edge of an associated one of said six latch members on said first and second ends of said attachment member, said six latch members' knife-edges each coming to rest on said rear surface of one of said saw-tooth shaped teeth, each set of recesses positioned in said ridge to independently receive an associated one of said latch members permitting said cover plate member to be mounted to said attachment member even if the wall into which said two ganged boxes are placed is not plane;

said cover plate device further comprising:

e. four tabs, two tabs adjacent said first end and two tabs adjacent said second end of said attachment member, said tabs permitting, when engaged by a suitable tool, removal of said cover plate member from said attachment member; and f. two slots in said second end of said cover plate member, at locations corresponding to the two tabs adjacent said second end of said attachment member to permit a suitable tool to enter one of said slots and contact an associated one of said tabs for removal of said cover plate member from said attachment member.

17. A cover plate device for covering two wall mounted wiring devices each mounted in and to one of two ganged boxes, one for each of said wiring devices mounted adjacent an aperture in a wall, said ganged boxes each having a width dimension and a height dimension, said cover plate device having no visible fasteners when installed comprising:

a. a unitary attachment member having a first end and a second end and a width dimension substantially less than a total width dimension of said two ganged boxes with which said cover plate device is employed, said attachment member having four mounting holes, two of said mounting holes adjacent said first end and two of said mounting holes adjacent said second end; said mounting holes permitting said attachment member to be attached to two wiring devices mounted in and to said two ganged boxes;

b. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than a combined width dimension of said two ganged boxes and a height dimension greater than said ganged box height dimension and having a first end and a second end and positioned to overlie said attachment member and said two ganged boxes in and to which said wiring devices are mounted;

c. at least two apertures in said attachment member to permit at least a portion of each of the wiring devices over which said attachment member is attached to project through said attachment member;

d. at least two apertures in said cover plate member, at least partially aligned with and partially communicating with each said aperture in said attachment member to permit at least a portion of each wiring device over which said attachment member is attached to project through said attachment member and said cover plate member;

e. said attachment member has an even number of apertures; said cover plate member has an even number of apertures equivalent to the number of apertures in said attachment member; said attachment member has an odd number of latch members adjacent each of said first and second ends of said attachment member, each of said odd number of latch members having a free end with a knife-edge thereat, the odd number of latch members adjacent said second end being equivalent to the odd number of latch members adjacent said first end; and an odd number of sets of recesses in said inner surface of said ridge equivalent to the number of latch members on said attachment member and arranged along said first end and said second end of said cover plate member on a one to one basis with said latch members, said sets each being formed by a plurality of saw-tooth shaped teeth having an inclined front surface and a rear surface perpendicular to the inner surface of said ridge to receive a knife edge of an associated one of said odd number of latch members on each of said first and second ends of said attachment member, said latch members' knife-edges each coming to rest on said rear surface of one of said saw-tooth shaped teeth, said latch members each independently taking a position in one of said recesses of an associated one of said sets of recesses permitting said cover plate member to be mounted on said attachment member even if the wall into which said ganged boxes are placed is not plane;

said cover plate device further comprising:

f. an even number of tabs adjacent said first end of said attachment member, the number of said tabs being equal to the number of apertures and an even number of tabs adjacent said second end of said attachment member, said number of tabs adjacent said second end of said attachment member being equal to the number of tabs adjacent said first end of said attachment member; and g. an even number of slots in said second end of said cover plate member, the number of slots being equal to the number of apertures, said slots being positioned at locations corresponding to the tabs on said attachment member to permit a suitable tool to enter one of said slots and contact an associated one of said tabs for removal of said cover plate member from said attachment member.

18. A cover plate device for covering two wall mounted wiring devices each mounted in and to one of an equal number of ganged boxes, one for each of said wiring devices mounted adjacent an aperture in a wall, said ganged boxes each having a width dimension and a height dimension, said cover plate device having no visible fasteners when installed comprising:

a. a unitary attachment member having a first end and a second end and a width dimension substantially less than a total width dimension of said equal number of ganged boxes with which said cover plate device is employed, said attachment member having four mounting holes, two of said mounting holes adjacent said first end and two of said mounting holes adjacent said second end; said mounting holes permitting said attachment member to be attached to said two wiring devices mounted in and to said equal number of ganged boxes;

b. three latch members adjacent each of said first end and said second end of said attachment member, each of said six latch members having a free end with a knife-edge thereat;

c. a cover plate member having a front surface and a rear surface and a ridge, said ridge having an inner surface and an outer surface, extending along an entire periphery of said rear surface to space said rear surface from any wall surface over which said cover plate member is applied; said cover plate member having a width dimension greater than a combined width dimension of said equal number of ganged boxes and a height dimension greater than said ganged box height dimension and having a first end and a second end and positioned to overlie said attachment member and said equal number of ganged boxes in and to which said wiring devices are mounted;

d. three recesses in said inner surface of said ridge adjacent each of said first and second ends of said cover plate member, said recesses each being formed by a plurality of saw-tooth shaped teeth having an inclined front surface and a rear surface perpendicular to the inner surface of said ridge to receive a knife edge of an associated one of said six latch members on said first and second ends of said attachment member, said six latch members' knife-edges each coming to rest on said rear surface of one of said saw-tooth shaped teeth, each of said six latch members operating independently and engaging one of said six recesses based upon a position of the wall adjacent said aperture to thereby assemble said cover plate member to said attachment member covering said attachment member, said equal number of ganged boxes and said aperture in said wall;

e. two apertures in said attachment member to permit at least a portion of each of the wiring devices over which said attachment member is attached to project through said attachment member;

f. two apertures in said cover plate member, at least partially aligned with and partially communicating with said two apertures in said attachment member to permit at least a portion of each of the wiring devices over which said attachment member is attached to project through said attachment member and said cover plate member;

said cover plate device further comprising:

g. an even number of tabs adjacent said first end of said attachment member, the number of said tabs being equal to the number of apertures and an even number of tabs adjacent said second end of said attachment member, said number of tabs adjacent said second end of said attachment member being equal to the number of tabs adjacent said first end of said attachment member; and h. an even number of slots in said second end of said cover plate member, the number of slots being equal to the number of apertures, said slots being positioned at locations corresponding to the tabs on said attachment member to permit a suitable tool to enter one of said slots and contact an associated one of said tabs for removal of said cover plate member from said attachment member.

* * * * *